Figure 1:
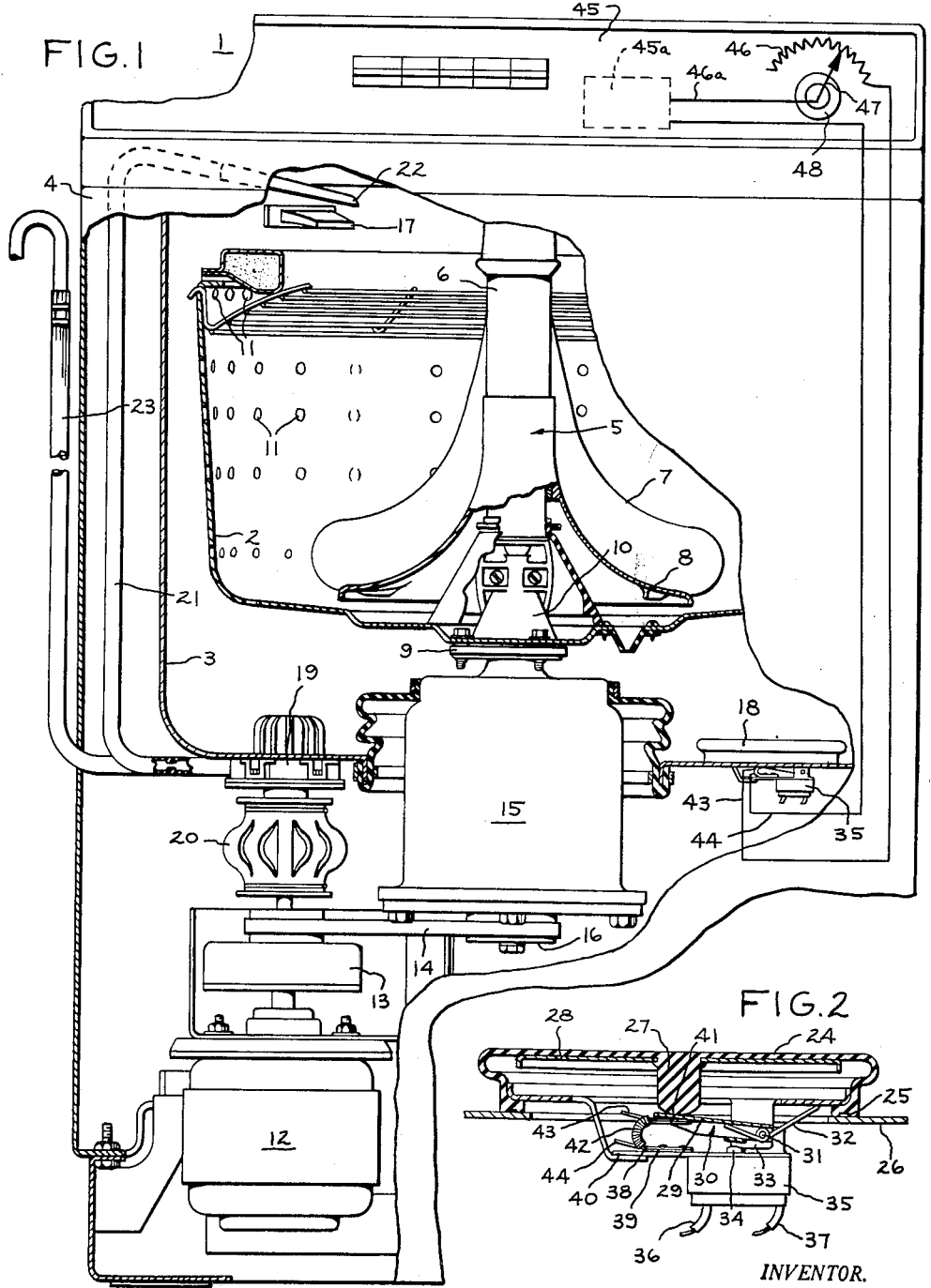

May 15, 1962

J. M. EVJEN 3,035,189

ADJUSTABLE PRESSURE-RESPONSIVE SWITCH

Filed April 22, 1960

INVENTOR.
JOHN M. EVJEN
BY
HIS ATTORNEY

United States Patent Office 3,035,189
Patented May 15, 1962

3,035,189
ADJUSTABLE PRESSURE-RESPONSIVE SWITCH
John M. Evjen, Louisville, Ky., assignor to General Electric Company, a corporation of New York
Filed Apr. 22, 1960, Ser. No. 23,999
5 Claims. (Cl. 307—118)

This invention relates to pressure responsive switches, and more particularly to a pressure responsive switch which is adjustable from a remote location.

Pressure responsive switches are used in many applications, such as, for instance, in washing machines to sense the level of liquid in the machine, in which adjustability is an important feature of the switch. At the present time the usual method of enabling adjustability in a pressure responsive switch, particularly where the pressure-responsive part itself is not readily accessible for manual adjustments, is to cause the pressure to actuate contacts remote therefrom by the intermediary of various expedients such as, for instance, a column of fluid which is compressed in response to movements of the pressure sensitive portion. By this means, the switch mechanism itself, i.e., the contacts, may have its adjustment varied in different ways. This type of approach does however involve the difficulty that a sealed connection between the pressure responsive portion of the device and the contacts is required thereby increasing the cost. In addition, the use of an intermediate column of fluid has been found, unless a relatively expensive hydraulic type of action is used, to restrict the adjustability to some extent.

In view of the foregoing, it is an object of my invention to provide an adjustable pressure-responsive switch in which the pressure-responsive member and the contacts actuated thereby are closely adjacent each other and in which, further, remote means for varying the response of the pressure responsive part are provided.

It is a further more specific object of my invention to achieve the aforementioned broad object by the provision of bimetallic means positioned to bias a pressure-responsive portion of the switch, with remotely controlled means determining the extent to which the bimetallic means effects biasing action by varying the heat input to the bimetallic element.

In one aspect thereof, it is an object of my invention to provide an adjustable pressure-responsive switch in which the conventional pressure-responsive movable member is, as usual, positioned to be moved in response to variations in the fluid pressure on the member and to actuate switch means at a predetermined fluid pressure level on the member. In order to exert a biasing force on the movable member, I provide bimetallic means, together with electric resistance heating means adjacent the bimetallic means. Variations in the temperature of the heating means vary the biasing force of the bimetallic means on the movable member. In series with the heating means, I provide adjustable impedance means; the voltage drop across the heating means is varied by adjustment of the impedance means, and this adjustment of course varies the temperature of the heating means. Since the temperature of the heating means determines the extent of biasing action of the bimetallic means on the movable member, this arrangement is effective to vary the predetermined fluid pressure level on the movable member at which the switch means is actuated.

It is apparent that with the foregoing structure the response of the pressure responsive switch may be adjusted by a remote device which is connected to the switch only by a pair of electrical conductors, a connection which may be made very cheaply and simply and which therefore provides substantial advantages over the presently available structures.

The features of my invention which are believed to be novel are set forth with particularity in the appended claims. The invention itself, however, both as to organization and the method of operation, together with further objects and advantages thereof, may best be understood by reference to the following detailed description taken in connection with the accompanying drawing.

Figure 2:
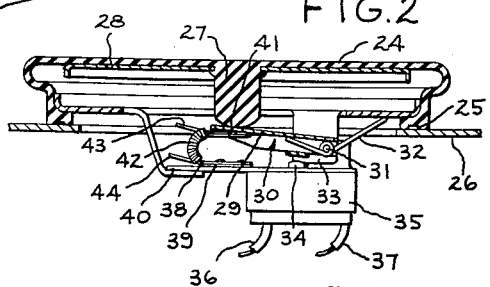

In the drawing;
FIGURE 1 is a front elevational view of a clothes washing machine including my improved pressure responsive switch arrangement, the view being partially broken away and partially in section to show details; and FIGURE 2 is an enlarged side elevational view of my improved switch, the view being partially broken away and partially in section to show details.

Referring now to the drawing, in FIGURE 1 there is shown an agitator type washing machine 1 which is used to illustrate one important application of my improved switch. The machine 1 has a perforated clothes basket 2 disposed within an outer imperforate tub or casing 3. Tub 3 is mounted within an appearance cabinet 4 which includes an appropriate cover (not shown) for providing access to the clothes basket. At the center of basket 2 there is provided a vertical axis agitator 5 which includes a center post 6 and a plurality of radially extending vanes 7 secured together at their lower end by an outwardly and downwardly flared skirt 8. Both the clothes basket 2 and the agitator 5 are rotatably mounted. The basket is mounted on a flange 9 of a rotatable hub 10 and the agitator is mounted on a shaft (not shown) which extends upwardly through hub 10 and center post 6. The agitator is secured to the shaft by any suitable means (not shown).

During the conventional cycle of operation of machine 1, the agitator may first be oscillated back and forth within the basket 2 to wash the clothes therein, after a suitable amount of water has been introduced to the basket. Then, after a predetermined period of this washing action, the basket 2 is rotated at high speed to extract centrifugally the washing liquid and discharge it into the outer tub 3 through appropriate small openings in basket 2, as shown at 11, for removal by a pump, as explained below. Following this extraction operation, a second supply of liquid is introduced into the wash basket for rinsing the clothes and the agitator is again oscillated. Finally, the basket is once more rotated at high speed to extract the rinse water from the clothes.

The basket 2 and agitator 5 may be driven by any suitable means, the drive means forming no part of the present invention. However, by way of example I have shown them as driven from a reversible motor 12 which drives the basket and agitator through a drive including a clutch 13 mounted on the motor shaft. Clutch 13 allows the motor to start without load and then picks up the load as it comes up to speed. A suitable belt 14 transmits power to a transmission assembly 15 through a pulley 16. Thus, depending upon the direction of motor rotation pulley 1 and transmission 15 are driven in opposite directions.

The transmission 15 is so arranged that it supports and drives the agitator drive shaft and the basket mounting hub 10. When motor 12 is rotated in one direction the transmission causes the agitator 5 to oscillate within the basket 2. Conversely, when the motor 12 is driven in the opposite direction, the transmission drives the wash basket and the agitator together at high speed for centrifugal extraction. While the drive means forms no part of the invention, reference is made to Patent 2,844,225, issued on July 22, 1958 to James R. Hubbard et al, and owned by the General Electric Company, assignee of the present invention. That patent discloses in detail the structural characteristics of a transmission assembly suitable for use in the illustrated machine.

In order to introduce washing and rinsing liquid into basket 2, a suitable conduit 17 is provided having an outlet opening over the basket so that water introduced into the conduit 17 flows into the basket. The water is supplied in the usual manner well known in the art and will not further be described herein. When water is introduced into the basket 2 through conduit 17, it rises in the basket 2 and tub 3. In the bottom of outer tub 3 there is positioned a pressure responsive switch 18, the structure of which constitutes my invention and which will be further described herebelow. With the level rising in basket 2 and tub 3 as the water continues to flow into conduit 17, the pressure on switch 18 increases until the desired level within the basket 2 is reached, at which point the switch 18 trips. Tripping of the switch causes, in the conventional manner, the closing of the valves (not shown) through which water was supplied to conduit 17, and a starting of the action of motor 12 to effect oscillation of agitator 5.

In addition to operating transmission 15 as described, motor 12 drives a pump 19 through a flexible coupling 20 which connects the motor shaft and the pump shaft. During washing and rinsing operations, pump 19 discharges into a conduit 21 which leads to a nozzle 22 positioned above basket 2 so that liquid passing from the bottom of tub 3 through conduit 21 may be recirculated through a suitable filter (not shown) in order to clean and filter the liquid during the operation. The system constantly circulates the washing liquid from tub 3 through conduit 21 and nozzle 22 back into basket 2 where it circulates within the basket 2 and tub 3 until it again passes through the recirculation conduit 21. At the end of the washing and rinsing portions of the cycle, and in response to a reverse direction of rotation of motor 12, pump 19 discharges into a conduit 23 which is adapted for discharge to a stationary tub or drain line so that the pump is effective to drain tub 3.

It will be observed from the foregoing general description of the washing machine of FIGURE 1 that the pressure responsive switch 18 is an important and integral part of the control of machine 1 and, in addition, that it is substantially inaccessible for manual adjustment. It is, however, a highly desirable feature to be able to provide varying liquid levels within basket 2 at which the switch 18 trips so that, for small loads of clothes, small amounts of liquid may be used and, correspondingly, for larger amounts of clothes larger amounts of liquid may be used.

By my invention, as shown in FIGURE 2, I provide a readily adjustable presure switch wherein the pressure switch may have its present location (substantially inaccessible to manual adjustment) and nonetheless manual adjustment may be effected by simple and economical means. The top surface of the pressure switch is comprised of a flat surface 24 of resilient material, such as rubber, which at its edge 25 is sealed to the lower surface 26 of tub 3. A downwardly projecting central portion 27 is formed in member 24 and this may in turn support, as shown, a reinforcing member 28 where so desired. The projecting knob 27 engages at its end a portion 29 of a member 30 pivotably secured on a pin 31 and biased by a spring 32 into engagement with knob 27. Member 30 further has a portion 33 which, when the downward movement of knob 27 causes counterclockwise pivoting of the member 30, pushes down a button 34 biased to project from a contact assembly 35 of the standard type having contacts 36 and 37 leading thereto. It will be understood that contacts 36 and 37 are connected to the conventional control circuit (not shown) of the machine; when button 34 is not depressed they provide for opening of the valves controlling admission of water through outlet 17, and when button 34 is depressed, they stop the flow of water through conduit 17 and start the operation of the motor in the direction to cause oscillation of agitator 5. A bimetallic element 38 is secured at one end 39 to a stationary member 40 and, at its other end 41, engages the end of knob 27 through portion 29 of member 30. A resistance heating coil 42 is wound around the bimetallic element 38, and is provided with electrical conductors 43 and 44 extending therefrom.

As can be seen in FIGURE 1, the conductors 43 and 44 extend upwardly within the casing 4 of the machine into the backsplasher 45 of the machine which is conventionally provided to accommodate the sequence control mechanism 45a controlling the supply of electric power to the machine components. Conductor 43 is connected to a resistor 46, and conductor 44 is connected through the control mechanism 45a to the source of power (not shown) and then to a conductor 46a leading to a movable contact 47 which may engage the resistor 46 anywhere along the length thereof. Moving the movable contact 47 to the left, as viewed in FIGURE 1, increases the resistance which is in series with the heater coil 42, and moving the contact to the right as viewed in FIGURE 1 decreases the resistance in series with the coil. The greater the resistance in series with the coil the smaller the voltage drop across the coil and consequently the smaller the heating effect of the coil. Thus, by manually varying the position of movable contact 47 (for instance, by use of a knob 48) the heating effect of coil 42 on the bimetal element 38 may be varied. It will, of course, be apparent that, instead of the simple series relationship illustrated for the resistance, a voltage divider-type circuit wherein the proportion of a resistance in parallel with the coil relative to the proportion of resistance in series with the coil may be used to vary the voltage across the coil, and that this type of arrangement is included in my general references to providing a resistance in circuit with the coil.

With the bimetal formed as shown in a U, the upward force from the bimetal may either increase or decrease, depending upon the characteristics and positioning of the strips forming the bimetal. For purposes of illustration, it will be assumed that in the present case the greater the heating effect of the coil, the greater the upward push of the bimetal, that is, the greater the resistance to deformation of member 24 in response to fluid pressure thereabove. The smaller the portion of resistance 46 provided in series with coil 42, the greater is the heating effect. It will, of course, be apparent that when the bimetal causes an upward force on the member 24, a greater amount of fluid pressure above the member 24 is required before the member will move down to cause depression of button 34.

In this manner, the level of liquid within tub 3 at which the switch mechanism 18 will be actuated, that is, at which the button 34 will be depressed, can thus be varied by manual variation of the position of movable contact 47 relative to resistance 46. The calibration of the resistance 46 and of the switch 18 is such that when the movable contact 47 is all the way over to its right hand position, that is, virtually none of resistance 45 is included in the circuit, the highest appropriate water level for use in machine 1 will be provided. Movement of the contact 47 all the way to the left to include all of the resistance 46 provides the smallest upward bias on the member 24 by bimetal 38, and the basket 2 is then filled only a relatively small amount before the button 34 is depressed.

It will be seen from the foregoing that an exceedingly economical and efficient means of effecting remote control of a pressure actuated switch mechanism is provided in which, although the switch mechanism is itself inaccessible, the control thereof is achieveable from a highly accessible position with the connection between the switch and the accessible position being effective by the simple and economical means of two electrical conductors.

While in accordance with the patent statutes I have described what at present is considered to be the preferred embodiment of my invention, it will be obvious to those skilled in the art that various changes and modifications may be made, and I therefore aim in the appended claims to cover all such changes and modifications as fall within the true spirit and scope of my invention.

What I claim as new and desire to secure by Letters Patent of the United States is:

1. An adjustable pressure responsive switch comprising: a movable member positioned to be moved in response to variations in the fluid pressure on said member; switch means poitioned to be actuated at a predetermined fluid pressure level on said member; bimetallic means positioned to exert a biasing force on said movable member; electric resistance heating means adjacent said bimetallic means, variations in the temperature of said heating means varying the biasing force of said bimetallic means on said movable member; and manually adjustable impedance means in circuit with said heating means, adjustment of said impedance means varying the voltage across said heating means which in turn varies the temperature of said heating means thereby to vary the predetermined fluid pressure level on said movable member at which said switch means is actuated.

2. The apparatus described in claim 1 wherein said bimetallic means is positioned to resist movement of said movable member, and heating by said heating means increases said resistance.

3. An adjustable pressure responsive switch comprising: a movable member positioned to be moved in response to variations in the fluid pressure on said member; switch means positioned to be actuated at a predetermined fluid pressure level on said member; means interposed between said movable member and said switch means for effecting said actuation of said switch means when it is moved by said movable member; bimetallic means having an end positioned to exert a biasing force on said movable member; electric resistance heating means wound around said bimetallic means in insulated relation thereto, variations in the temperature of said heating means varying the biasing force of said bimetallic means on said movable member; and manually adjustable resistance means in circuit with said heating means, adjustment of said resistance means varying the voltage across said heating means which in turn varies the temperature of said heating means thereby to vary the predetermined fluid pressure level on said movable member at which said switch means is actuated.

4. An adjustable pressure responsive switch comprising: a flexible diaphragm positioned to be exposed to a fluid pressure and formed to be moved in response to variation in that fluid pressure, said diaphragm including an actuating projection substantially centrally located on the side thereof opposite to the side exposed to said fluid pressure; switch means including a button positioned to be depressed in response to a predetermined amount of movement of said projection; an electric resistance heating element positioned adjacent said bimetallic means, variations in the temperature of said element varying the biasing force of said bimetallic means on said projection; and a manually adjustable resistor in series with said coil, variation of the resistance of said resistor varying the temperature of said heating means thereby to vary the predetermined fluid pressure level on said movable member at which said projection actuates said button.

5. The apparatus defined in claim 4 wherein spring means are provided in engagement with said projection, said spring means providing a predetermined amount of resistance to movement of said projection independently of said bimetallic element.

References Cited in the file of this patent

UNITED STATES PATENTS 2,582,483   Hallerberg _____ Jan. 15, 1952